(12) United States Patent
Vinciarelli (10) Patent No.: US 12,483,138 B1
(45) Date of Patent: Nov. 25, 2025

(54) HIGH-BANDWIDTH FACTORIZED POWER SYSTEM AND REGULATOR

(71) Applicant: Vicor Corporation, Andover, MA (US)

(72) Inventor: Patrizio Vinciarelli, Boston, MA (US)

(73) Assignee: Vicor Corporation, Andover, MA (US)

( * ) Notice: Subject to any disclaimer, the term of this patent is extended or adjusted under 35 U.S.C. 154(b) by 100 days.

(21) Appl. No.: 18/224,744

(22) Filed: Jul. 21, 2023

(51) Int. Cl.
*H02M 3/158* (2006.01)
*H02M 1/08* (2006.01)
*H02M 1/44* (2007.01)

(52) U.S. Cl.
CPC .......... *H02M 3/1582* (2013.01); *H02M 1/08* (2013.01); *H02M 1/44* (2013.01)

(58) Field of Classification Search
CPC ......... H02M 3/1582; H02M 1/08; H02M 1/44
See application file for complete search history.

(56) References Cited

U.S. PATENT DOCUMENTS

| | | | |
|---|---|---|---|
| 6,788,033 B2 | 9/2004 | Vinciarelli | |
| 6,930,893 B2 | 8/2005 | Vinciarelli | |
| 6,975,098 B2 | 12/2005 | Vinciarelli | |
| 6,984,965 B2 | 1/2006 | Vinciarelli | |
| 7,145,786 B2 | 12/2006 | Vinciarelli | |
| 7,154,250 B2 | 12/2006 | Vinciarelli | |
| RE40,072 E | 2/2008 | Prager et al. | |
| 7,561,446 B1 | 7/2009 | Vinciarelli | |
| 7,920,391 B1 | 4/2011 | Vinciarelli | |
| 8,669,744 B1 | 3/2014 | Vinciarelli | |
| 9,712,055 B1 | 7/2017 | Swartz et al. | |
| 9,787,179 B1 * | 10/2017 | Clarkin | G05F 1/40 |
| 9,899,924 B1 | 2/2018 | Vinciarelli | |
| 10,050,519 B2 | 8/2018 | Vinciarelli | |
| 10,135,334 B1 | 11/2018 | Vinciarelli et al. | |
| 11,870,340 B1 | 1/2024 | Vinciarelli et al. | |
| 2013/0141070 A1 * | 6/2013 | Goessling | H02M 1/10 323/284 |
| 2019/0115823 A1 * | 4/2019 | Lidsky | H02M 3/158 |

OTHER PUBLICATIONS

Arbetter et al., "DC-DC Converter Design for Battery-Operated Systems," Proceedings of PESC '95—Power Electronics Specialist Conference, Jun. 1995, pp. 103-109.

(Continued)

*Primary Examiner* — Adolf D Berhane
*Assistant Examiner* — Afework S Demisse
(74) *Attorney, Agent, or Firm* — Fish & Richardson P.C.

(57) ABSTRACT

A high bandwidth factorized power system comprises a discontinuous-mode regulator supplying the input of a fixed-ratio power converter providing an output voltage. The discontinuous-mode regulator delivers power to the fixed ratio converter in a series of operating cycles, each cycle comprising an input phase during which energy is drawn from the input source to an inductor and an output phase during which energy is delivered from the inductor to the regulator output. A controller begins the input phase of an operating cycle of the regulator after the end of the output phase upon sensing that the output voltage is below a minimum voltage threshold.

78 Claims, 5 Drawing Sheets

(56) References Cited

OTHER PUBLICATIONS

Arbetter et al., "DC-DC Converter with Fast Transient Response and High Efficiency for Low-Voltage Microprocessor Loads," Presented at APEC '98 Thirteenth Annual Applied Power Electronics Conference and Exposition, Anaheim, CA, USA, Feb. 15-19, 1998, pp. 156-162.

Belloumi et al., "Self-oscillating half bridge series resonant converter at high efficiency," Presented at 16th IEEE Mediterranean Electrotechnical Conference, Yasmine Hammamet, Tunisia, Mar. 25-28, 2012, pp. 306-311.

Chauhan, "Hysteretic controlled DC-DC converters," Thesis submitted in partial fulfillment for the degree of Master of Science in Engineering, Wright State University, Department of Electrical Engineering, 2014, 84 pages.

electronicdesign.com [online], "Hysteretic-Mode Converters Demystified, Part 1," May 27, 2016, retrieved on Jan. 23, 2023, retrieved from URL<https://www.electronicdesign.com/technologies/dc-dc-converters/article/21199080/hystereticmode-converters-demystified-part-1>, 18 pages.

Fu et al., "A DCM-Only Buck Regulator With Hysteretic-Assisted Adaptive Minimum-On-Time Control for Low-Power Microcontrollers," IEEE Transactions on Power Electronics, Jan. 2016, 31(1):418-429.

Maniktala, "Voltage-Mode, Current-Mode (and Hysteretic Control)," Technical Note TN-203, Microsemi, 2012, 19 pages.

Sahu et al., "An Accurate, Low-Voltage, CMOS Switching Power Supply With Adaptive On-Time Pulse-Frequency Modulation (PFM) Control," IEEE Transactions on Circuits and Systems—I: Regular Papers, Feb. 2007, 54(2):312-321.

Switching and linear power supply, power converter design, Pressman, 1977, pp. 216-219.

uliege.be [online], "Hysteretic Buck Regulators," retrieved on Jan. 23, 2023, retrieved from URL<https://people.montefiore.uliege.be/geuzaine/ELEC0055/hysteretic_buck_regulators.pdf>, 10 pages.

U.S. Appl. No. 17/881,144, filed Aug. 4, 2022, Vinciarelli.

Oliveira et al., "Control of a Discontinuous-Conduction-Mode ZVS Buck-Boost Topology for Microprocessor Core Power," VICOR PowerBench, Rev. 1.1, May 2018, 10 pages.

* cited by examiner

HIGH-BANDWIDTH FACTORIZED POWER SYSTEM AND REGULATOR

FIELD OF THE INVENTION

This invention relates to the field of power conversion, and more specifically to multistage power conversion systems and regulators.

BACKGROUND

Contemporary electronic systems may comprise integrated digital circuits (e.g., central processing units, graphics processing units, application specific integrated circuits) that operate at voltage levels below one volt and that consume hundreds of Amperes of current. These systems typically require power supplies that exhibit high power density and high conversion efficiency, as well as sufficient control bandwidth to ensure that large, fast, current transients can be supported while maintaining circuit voltage within an acceptable operating range.

A factorized power system comprises a pre-regulator module ("PRM") that receives power from an input source and delivers a PRM output DC voltage to the input of a DC-DC voltage-transformation module ("VTM"). The VTM converts the DC output voltage of the PRM to the DC voltage required by a load using a fixed transformation ratio K=Vout/Vin with a low output resistance. The VTM may be an isolated or non-isolated converter. A controller, which may be included in the PRM, may provide output voltage regulation by adjusting the PRM output voltage. Factorized power systems may provide many advantages, including high overall conversion efficiency and high power density. A VTM can be designed to efficiently transform a relatively high input voltage (e.g., 24V, 48V) directly to a low load voltage (e.g. below one volt). By placing filtering capacitors at the high input voltage of the VTM, the VTM can, through capacitance multiplication, substantially reduce the volume of filtering capacitors required at the point-of-load.

Non-isolated buck, boost and buck-boost switching power converters are examples of converters that comprise an inductor and switches and operate in a series of converter operating cycles during which energy is transferred from an input source to the converter output. Such converters may be controlled to operate in a discontinuous mode of operation in which energy transfer to the output of the converter ceases at some time during each operating cycle.

SUMMARY

In one aspect, the invention features a high-bandwidth factorized power system that includes a discontinuous-mode pre-regulator that receives an input voltage from an input source and delivers a pre-regulator output voltage in a series of operating cycles, each operating cycle including an input phase during which energy is drawn from the input source and an output phase during which energy is delivered to the pre-regulator output, and a fixed-ratio power converter, characterized by a fixed input-to-output voltage transformation ratio, K, and an output resistance, that includes an input connected to the pre-regulator output and an output connected to a load at an output voltage, in which the discontinuous mode pre-regulator begins the input phase of an operating cycle after the end of the output phase a short delay time after sensing that the output voltage is below an output voltage threshold.

Implementation of the invention may include one or more of the following, and is not limited to the following. The pre-regulator circuit is a self-contained assembly adapted to be installed as a unit at a first location, and the fixed ratio power converter is a self-contained assembly adapted to be installed as a unit at a second location separated from the first location.

The fixed-ratio power converter includes a Sine-amplitude converter. The discontinuous mode pre-regulator includes a buck, or buck-boost, converter comprising a first switch, a second switch, an inductor, and a controller for controlling the switches to regulate the output voltage.

The output voltage of the system is regulated to an average level above the output voltage threshold.

The system includes a comparator for sensing when the output voltage is below the output voltage threshold, and circuitry that: turns the first switch ON, within a short delay time after the sensing by the comparator, to initiate the input phase during which a forward current increases in the inductor, turns the first switch OFF to end the input phase, turns the second switch ON after the voltage across the second switch has fallen below a zero-voltage switching (ZVS) threshold following the end of the input phase, turns the second switch OFF to end the output phase when the current in the inductor crosses a current threshold, and holds the first and second switches OFF after the end of the output phase if the output voltage is above the output voltage threshold.

The pre-regulator includes a clamp circuit for trapping energy in the inductor during a portion of the operating cycle. The clamp circuit traps energy in the inductor by effectively short-circuiting the inductor during a portion of the operating cycle. The clamp circuit includes a semiconductor switch. The semiconductor switch includes a field-effect transistor. In some examples, the pre-regulator features a pre-defined current threshold that is selected to end the output phase after the inductor current reverses. In some examples, the pre-regulator features a pre-defined current threshold that is selected to end the output phase by turning OFF the second switch. The clamp circuit conducts a reverse inductor current, e.g., after the inductor current has reached the current threshold. The clamp circuit is turned OFF prior to the input phase of the next operating cycle when the output voltage is below the output voltage threshold. The flow of reverse current after the clamp circuit is turned OFF charges and discharges parasitic capacitances of the first and second switches during a ZVS phase.

The controller in the pre-regulator adjusts the ON time of the first switch so that the current in the inductor at the end of the input phase, $I_P$, is substantially independent of the values of the pre-regulator input and output voltages. The controller adjusts the ON time of the first switch to be inversely proportional to a difference between the input voltage and the pre-regulator output voltage. The pre-regulator includes blanking circuitry for preventing initiation of an operating cycle during a period beginning with the sensing by the comparator and ending at the end of the output phase.

The output voltage threshold is a reference voltage, $V_{REF}$. The output voltage is approximately equal to the pre-regulator output voltage multiplied by K. The output voltage is approximately equal to $K*V_R - R_O*I_O$, $V_R$ is the pre-regulator output voltage, $R_O$ is the output resistance of the power converter, and $J_O$ is an output current of the power converter delivered to the load.

The system includes an error amplifier with a fixed gain of the order of G=1/K, where K is the transformation ratio of the fixed-ratio power converter. The controller is configured to control the switches to preclude the minimum peak of the output voltage from falling substantially below the reference voltage, $V_{REF}$, for example, preclude the minimum peak of the output voltage from falling below 95% of the reference voltage, $V_{REF}$. The short delay time is in a range from 10 to 100 nS.

For example, the first location is at least 2 inches away from the load, and the second location is within 1 inch from the load. The self-contained assembly of the pre-regulator includes a first circuit board or substrate, a first set of electronic components mounted on or in the first circuit board or substrate, wherein the self-contained assembly of the fixed-ratio power converter includes a second circuit board or substrate different from the first circuit board or substrate, and a second set of electronic components mounted on or in the second circuit board or substrate.

In another aspect, the invention features a discontinuous mode regulator that includes an input for receiving power from an input source at an input voltage, an output for delivering power to a load at an output voltage, an inductor, switches for connecting the input source to the inductor, a clamp circuit connected across the inductor for trapping energy in the inductor by effectively short-circuiting the inductor during a portion of the operating cycle, and a discontinuous-mode controller for controlling the switches in the regulator in a series of operating cycles. The discontinuous-mode controller includes an input for sensing the output voltage, a comparator for sensing when the output voltage is below an output voltage threshold, circuitry for controlling the switches in a series of operating cycles, each operating cycle including a ZVS phase during which a reverse inductor current charges and discharges parasitic capacitances associated with the switches, an input phase during which the inductor is connected to the input and a forward current increases in the inductor, and a clamp interval during which the clamp circuit is ON, trapping a reverse flow of current in the inductor, and in which the controller begins the input phase of an operating cycle after the end of the output phase a short delay time after sensing that the pre-regulator output voltage is below a pre-defined output voltage threshold.

Implementation of the invention may include one or more of the following, and is not limited to the following. The clamp circuit includes a semiconductor switch. The semiconductor switch includes a field-effect transistor. The controller ends the output phase after the inductor current reverses. The clamp circuit is configured to conduct reverse inductor current after the end of the output phase. The clamp circuit is turned OFF when the pre-regulator output voltage is below the output voltage threshold. The controller adjusts the duration of the input phase so that the current in the inductor at the end of the input phase, $I_P$, is substantially independent of the values of the input and output voltages. The controller adjusts the duration of the input phase to be inversely proportional to a difference between the input voltage and the output voltage. The pre-regulator includes blanking circuitry for preventing initiation of an operating cycle before the end of the output phase.

The controller controls the switches to regulate the minimum peaks of the output voltage at the output voltage threshold. For example, the controller is configured to control the switches to preclude the minimum peak of the output voltage from falling substantially below the output voltage threshold, e.g., control the switches to preclude the minimum peak of the output voltage from falling below 95% of the output voltage threshold. The output voltage threshold is a reference voltage, $V_{REF}$. The short delay time is in a range from 10 to 100 nS.

In another aspect, the invention features a method for providing high-bandwidth control of a factorized power conversion system that includes a discontinuous-mode pre-regulator and a fixed-ratio power converter. The discontinuous-mode pre-regulator includes a first switch, a second switch, an inductor, and a controller; the fixed-ratio power converter is characterized by a fixed input-to-output voltage transformation ratio, K, and an output resistance. The discontinuous-mode pre-regulator receives an input voltage from an input source and delivers a pre-regulator output voltage in a series of operating cycles, each operating cycle comprising an input phase during which energy is drawn from the input source and an output phase during which energy is delivered to the pre-regulator output. The pre-regulator output voltage is delivered to the input of the fixed-ratio power converter and the fixed-ratio power converter has an output connected to a load.

Implementation of the invention may include one or more of the following, and is not limited to the following. The pre-regulator is a self-contained assembly adapted to be installed as a unit at a first location, and the fixed ratio power converter is a self-contained assembly adapted to be installed as a unit at a second location separated from the first location. The method includes providing a comparator in the controller that generates a sense signal when the pre-regulator output voltage falls below a minimum threshold. The controller turns the first switch ON to initiate the input phase. The controller turns the second switch ON when a voltage across the second switch falls below a threshold following the input phase. The controller turns the second switch OFF when an inductor current crosses a threshold. The controller generates a blanking interval beginning with the turn ON of the first switch and ending with the turn OFF of the second switch. The controller turns the first switch ON after a short delay time if the comparator is generating the sense signal, except during the blanking interval.

The discontinuous-mode pre-regulator includes a clamp circuit and the controller turns ON the clamp circuit to store energy in the inductor during a clamp phase.

For example, the short delay time is in a range from 10 to 100 nS. For example, the first location is at least 2 inches away from the load, and the second location is within 1 inch from the load.

In another aspect, the invention features a method for providing high-bandwidth control of a discontinuous-mode regulator that includes a first switch, a second switch, an inductor, and a controller, and that receives an input voltage from an input source and delivers a regulator output voltage to a load in a series of operating cycles, each operating cycle including an input phase during which energy is drawn from the input source and an output phase during which energy is delivered to the regulator output.

Implementation of the invention may include one or more of the following, and is not limited to the following. The method includes providing a sense signal to a comparator in the controller to sense when the pre-regulator output voltage falls below a minimum threshold. The controller turns the clamp switch OFF and turns the first switch ON to initiate the input phase. The controller turns the second switch ON when a voltage across the second switch falls below a threshold following the input phase. The controller turns the second switch OFF when an inductor current crosses a threshold. The controller turns ON the clamp circuit to store energy in the inductor during a clamp phase. The controller generates a blanking interval beginning with the turn ON of the first switch and ending with the turn OFF of the second switch. The controller turns the first switch ON a short delay time after the pre-regulator output voltage falls below a pre-determined minimum threshold, except during the blanking interval.

In another aspect, the invention features an apparatus that includes a discontinuous mode regulator that performs cycle-by-cycle control of energy transfer through the regulator during each of a plurality of operating cycles. The regulator includes a comparator configured to sense a regulator output voltage $V_R$ and generate a start signal when the regulator output voltage $V_R$ falls below an output voltage threshold. The start signal indicates a beginning of a new operating cycle. The discontinuous mode regulator is configured to operate with an operating frequency of at least 1 MHz at peak power delivered to an output node of the discontinuous mode regulator.

Implementations may include one or more of the following features, and is not limited to the following features. The apparatus further includes a fixed-ratio power converter having a fixed voltage transformation ratio, K, and a converter output resistance $R_O$. The fixed-ratio power converter includes a converter input and a converter output, the converter input is electrically connected to an output of the discontinuous mode regulator, and the converter output is electrically connected to a load. The fixed-ratio power converter delivers power to the load at an output voltage $V_O$ that is approximated by $V_O=K*V_R-R_O*I_O$, in which $I_O$ represents a fixed-ratio power converter output current delivered to the load.

A peak current delivered by the fixed-ratio power converter to the load is in a range from 100 A to 1000 A.

The discontinuous mode regulator is configured to provide an output voltage with a ripple voltage less than 5% at 10% of maximum output power, and a ripple voltage less than 1% at 100% of maximum output power.

The discontinuous mode regulator is configured to provide an output voltage with a ripple voltage less than 1% at 10% of maximum output power, and a ripple voltage less than 0.1% at 100% maximum output power.

Other embodiments and features will become apparent from the following description and from the claims.

DETAILED DESCRIPTION

A Factorized Power Architecture suited for supplying power to low voltage high current loads is described in Vinciarelli, Factorized Power with Point of Load Sine Amplitude Converters, U.S. Pat. No. 6,975,098, issued Dec. 13, 2005 and in Vinciarelli, Factorized Power with Point of Load Sine Amplitude Converters, U.S. Pat. No. 6,984,965, issued Jan. 10, 2006 (collectively the "Factorized Patents") (both assigned to Vicor Corporation of Andover, MA., and the entire disclosure of each patent is incorporated herein by reference). Power converters which function as DC-to-DC transformers called Voltage Transformation Modules ("VTM") and Sine Amplitude Converters ("SAC") which have a transfer function approximating $V_O=K*Vin-I_O*R_O$ (i.e., fixed-ratio converters) are described in Vinciarelli, Factorized Power with Point of Load Sine Amplitude Converters, U.S. Pat. No. 6,930,893, issued Aug. 16, 2005 and in Vinciarelli, Point of Load Sine Amplitude Converters and Methods, U.S. Pat. No. 7,145,786, issued Dec. 5, 2006 (collectively the "SAC Patents") (both of which are assigned to Vicor Corporation of Andover, MA., and the entire disclosure of each is incorporated herein by reference).

A buck converter comprising a clamp circuit for trapping energy in the inductor when operating in a discontinuous mode and recycling the trapped energy to discharge parasitic capacitances within the converter in order to fully or partially achieve zero-voltage switching ("ZVS") of a switch, is described in Prager et al, Loss and Noise Reductions in Power Converters, U.S. Pat. RE40,072, issued Feb. 19, 2008 (the "Loss and Noise Reduction Patent")(assigned to Vicor Corporation of Andover, MA., the entire disclosure of which is incorporated herein by reference). A buck converter comprising a clamp circuit for trapping energy in the inductor when operating in a discontinuous mode and in which a reverse current that flows in the inductor is adjusted, based upon circuit operating conditions, so that the amount of energy stored in the inductor at the end of the reverse energy phase is approximately equal to, but preferably no greater than, that required to turn a switch in the converter ON at substantially zero voltage, is described in Vinciarelli, Adaptive Control of Switching Losses in Power Converters, U.S. Pat. No. 8,669,744, issued Mar. 11, 2014 (the "Adaptive Patent") (assigned to Vicor Corporation of Andover, MA., the entire disclosure of which is incorporated herein by reference).

A variable frequency, discontinuous-mode buck regulator, with switch timing controlled to provide a constant peak value of inductor current, and a single ZVS interval, is described in Arbetter et al, *DC-DC Converter Design for Battery-Operated Systems*, PESC '95 Proceedings, June 1995, Vol. 1, pp. 103-109 ("Arbetter"). A variable frequency, discontinuous-mode buck regulator, with switch timing controlled to provide a constant peak value of inductor current, and using a comparator to control the low peak of the output ripple over a portion of a range of converter load, is described in Fu et al, *A DCM-Only Buck Regulator with Hysteretic-Assisted Adaptive Minimum-On-Time Control for Low-Power Microprocessors*, IEEE Transactions on Power Electronics, Vol. 31, Issue 1, January 2016, pp. 418-429 ("Fu"). A variable frequency, discontinuous-mode buck regulator, with switch timing controlled to provide a constant peak value of inductor current, and using a comparator to control the low peak of the output ripple is described in Sahu et al, *An accurate, Low-Voltage, CMOS Switching Power Supply With Adaptive On-Time Pulse-Frequency Modulation (PFM) Control*, IEEE Transactions on Circuits and Systems-I: Regular Papers, 2007, Vol. 54, Issue 2, pp. 312-32 ("Sahu"). A variable frequency, discontinuous-mode buck converter comprising a hysteretic comparator circuit is described in Pressman, *Switching and Linear Power Supply, Power Converter Design*, ISBN 0-8104-5857-0, 1977, pp. 216-219 ("Pressman").

Control and compensation schemes for switching power converters are described in Maniktala, *Voltage-Mode, Current-Mode (and Hysteretic Control)*, Microsemi Technical Note TN-203, Rev. 0.6, November 2012 ("Maniktala"). A compensation scheme for a factorized power system is described in Oliveira et al, *Control of a Discontinuous-Conduction-Mode ZVS Buck-Boost Topology for Microprocessor Core Power*, VICOR PowerBench, Rev. 1.1, May 2018 ("Oliveira").

Figure 1:
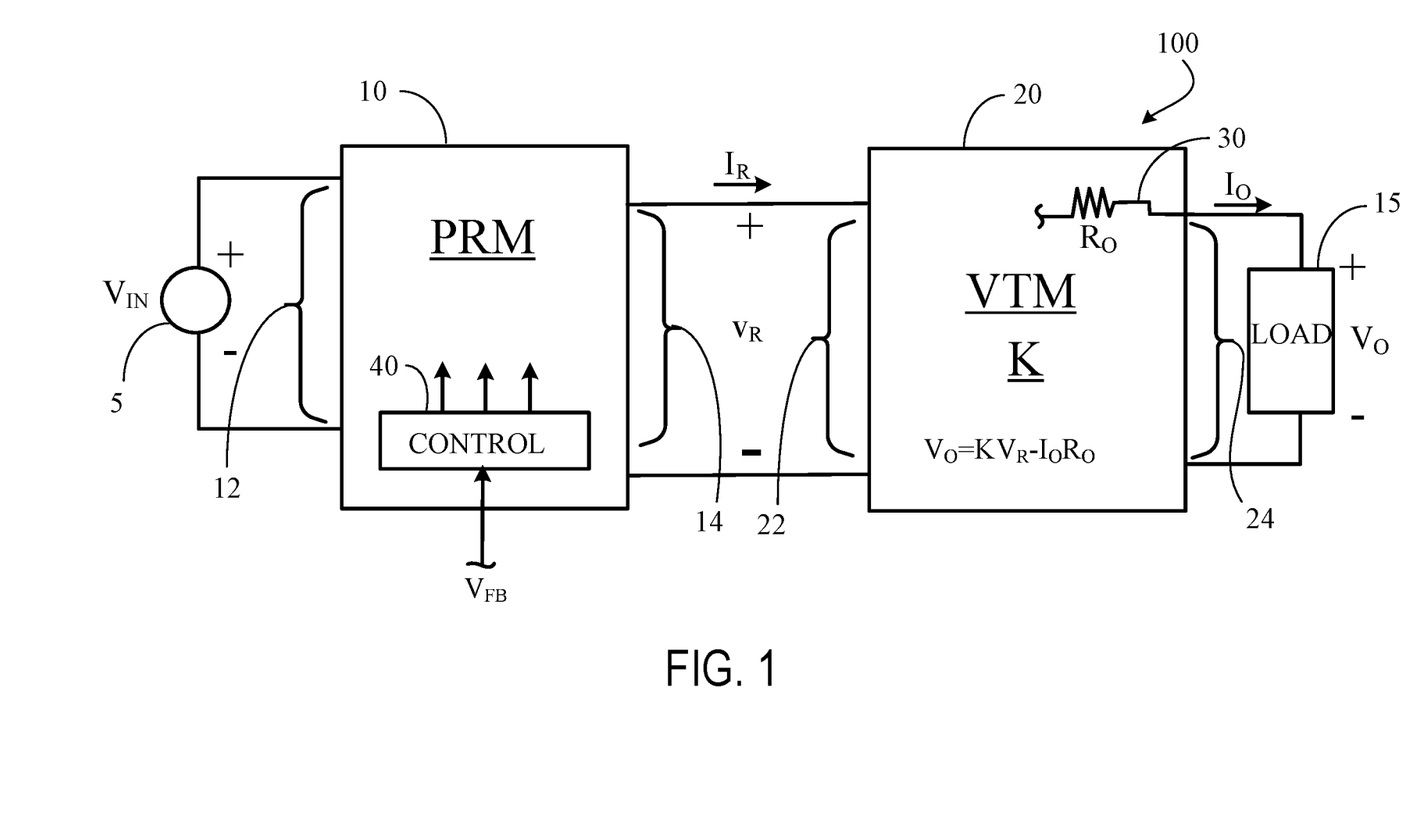
FIG. 1 is a block diagram of a factorized power system.

An example of a Factorized Power Conversion system 100 is shown in FIG. 1. The system comprises an input source 5; a pre-regulator module ("PRM") 10, having a PRM input 12 and a PRM output 14; a voltage-transformation module ("VTM") 20, having a VTM input 22 and a VTM output 24; and a load 15. The PRM 10 receives power from the input source 5, at an input voltage $V_{in}$, and delivers power, at a pre-regulator output voltage $V_R$, to the input of the VTM 20. The VTM 20 delivers power to the load 15, at an output voltage $V_O$ that is closely approximated by $V_O = K^* V_R - R_O^* I_O$, where K is a constant that defines the fixed transformation ratio of the VTM ($K = V_R/V_O$), $R_O$ 30 is the converter output resistance, and $I_O$ is the VTM output current delivered to the load 15. In some examples, the VTM 20 is referred to as a fixed-ratio power converter. In some examples, the VTM 20 is part of a fixed-ratio power converter. The PRM 10 comprises a controller 40 that receives a feedback signal $V_{FB}$, indicative of a converter 100 output voltage, compares $V_{FB}$ to a reference voltage (not shown in FIG. 1), and controls switches (not shown in FIG. 1) within the PRM 10 as a means of controlling the converter output voltage. If, for example, $V_{FB}$ is derived from the PRM output 14, the PRM output voltage $V_R$ will be controlled, whereas if $V_{FB}$ is derived from the VTM output 24, the VTM output voltage $V_O$ will be controlled.

In some implementations, the pre-regulator module (or circuit) 10 may be a self-contained assembly adapted to be installed as a unit at a first location, and the VTM 20 may be a self-contained assembly adapted to be installed as a unit at a second location separated from the first location. The pre-regulator module 10 may be manufactured separately from the VTM 20. The pre-regulator module 10 may include a first circuit board or substrate, and a first set of electronic components mounted on or in the first circuit board or substrate. The VTM 20 may include a second circuit board or substrate, and a second set of electronic components (including, e.g., a transformer) mounted on or in the second circuit board or substrate. In some examples, the pre-regulator module 10, the VTM 20, and the load 15 may be mounted on a third circuit board or substrate, in which the VTM 20 is positioned closer to the load 15, and the pre-regulator module 10 is positioned farther away from the load 15. In some examples, the pre-regulator module 10 may be positioned at least 2 inches away from the load 15, and the VTM 20 may be positioned within 1 inch from the load 15. In some examples, the pre-regulator module 10 and the VTM 20 may be stacked one above the other. For example, each self-contained assembly can be an encapsulated package that includes an integrated circuit enclosed or partially enclosed by an encapsulant material and have input/output terminals for transmitting and/or receiving control, data, and/or power signals. For example, the second location may be near the load 15, and the first location may be farther away from the load 15. For example, the signal line(s) from the output of the VTM 20 to the input of the load 15 may have a length L, and the distance between the pre-regulator module 10 and the load 15 may be greater than L. These are merely examples, the invention is not limited to the examples described above.

A PRM may be a switching power converter operating in a discontinuous-mode (as defined herein, a discontinuous-mode switching power converter is a switching converter that transfers energy between the input and output of the converter in a series of converter operating cycles and in which energy transfer to the output of the converter ceases at some time during each operating cycle). A wide variety of discontinuous mode converters are known, including, e.g., buck, boost, and buck-boost topologies. Examples of buck converters and boost converters are described in U.S. Pat. Nos. 9,899,924, 8,669,744, and U.S. Pat. RE40,072, assigned to Vicor Corporation, and U.S. Pat. Nos. 9,787,179 and 9,712,055, assigned to Picor Corporation, all of which are herein incorporated by reference. Examples of buck-boost converters are described in U.S. Pat. Nos. 10,135,334, 10,050,519, 9,899,924, 8,669,744, 7,920,391, 7,561,446, and 6,788,033, assigned to Vicor Corporation, all of which are herein incorporated by reference.

One known way to control a discontinuous-mode converter ("DCM") is to provide a high gain error amplifier that senses an output voltage, compares it to a reference voltage, and generates an error voltage which is used to adjust the timing of switches within the converter as a means of reducing the error voltage. This type of "analog" negative feedback typically regulates the average output voltage and depends on high loop gain to achieve low average error. A drawback of this method is that the loop gain must be compensated (poles, zeros) to ensure closed-loop stability of the converter (see, e.g., Maniktala, Oliviera). These compensation schemes may be complex and typically limit the bandwidth of the converter. Other known ways to control a DCM include hysteretic comparator control (e.g., in Pressman; Maniktala) and non-hysteretic comparator control (e.g., as in Arbetter; Fu; Sahu).

The operating voltage for low voltage, high current, digital devices (e.g., 1.0V, 0.8V) is typically controlled to remain within a specified operating range (average voltage, ripple). Moreover, for some digital devices, it may be a requirement that, to ensure proper circuit operation, the voltage remains above a defined lower limit. For some digital devices, these requirements must be met under all operating conditions, including during large, rapid, changes in current.

Figure 2:
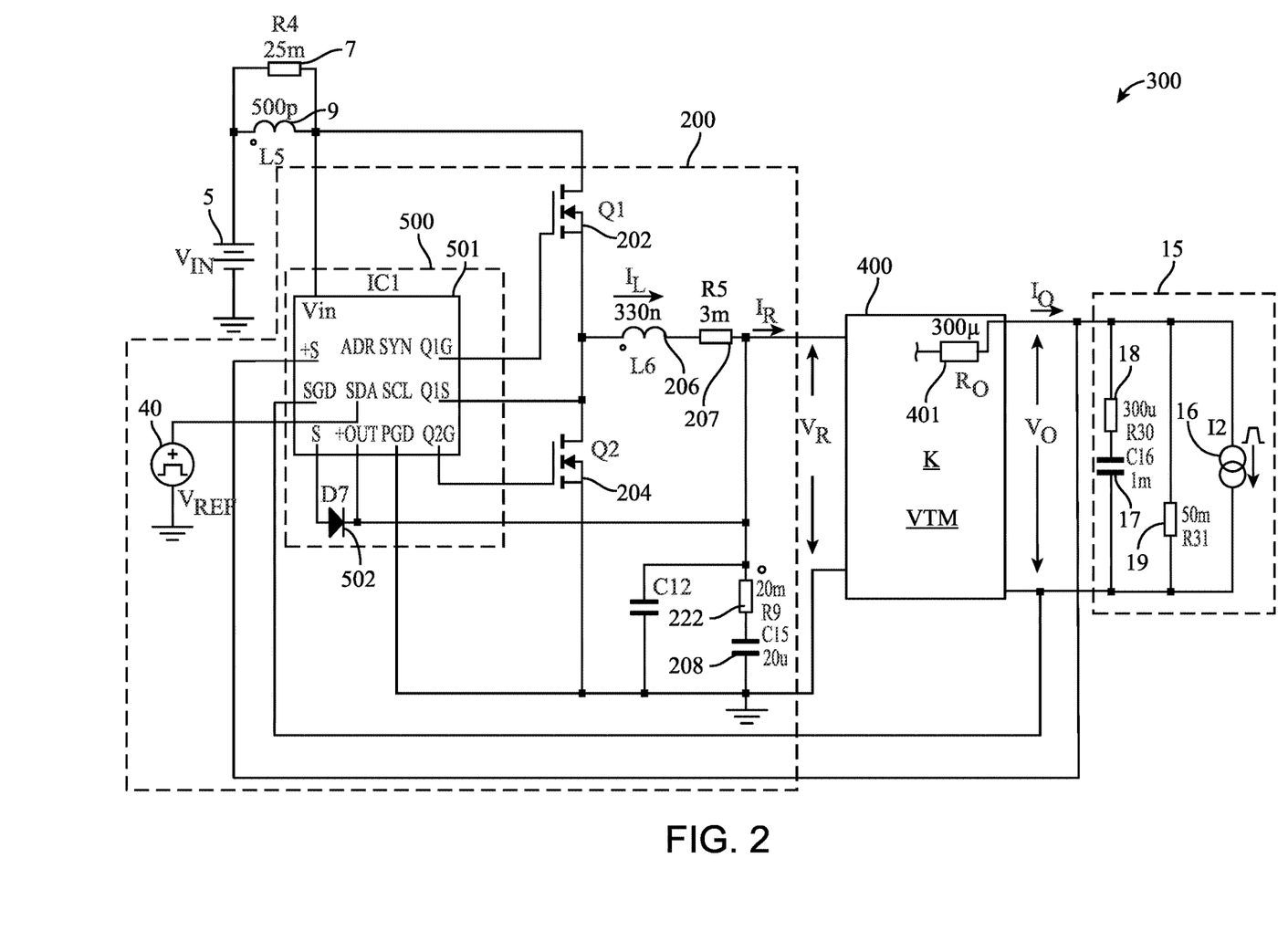
FIG. 2 is a schematic block diagram of a high bandwidth factorized power system comprising a high-bandwidth regulator according to the invention.
Figure 3:
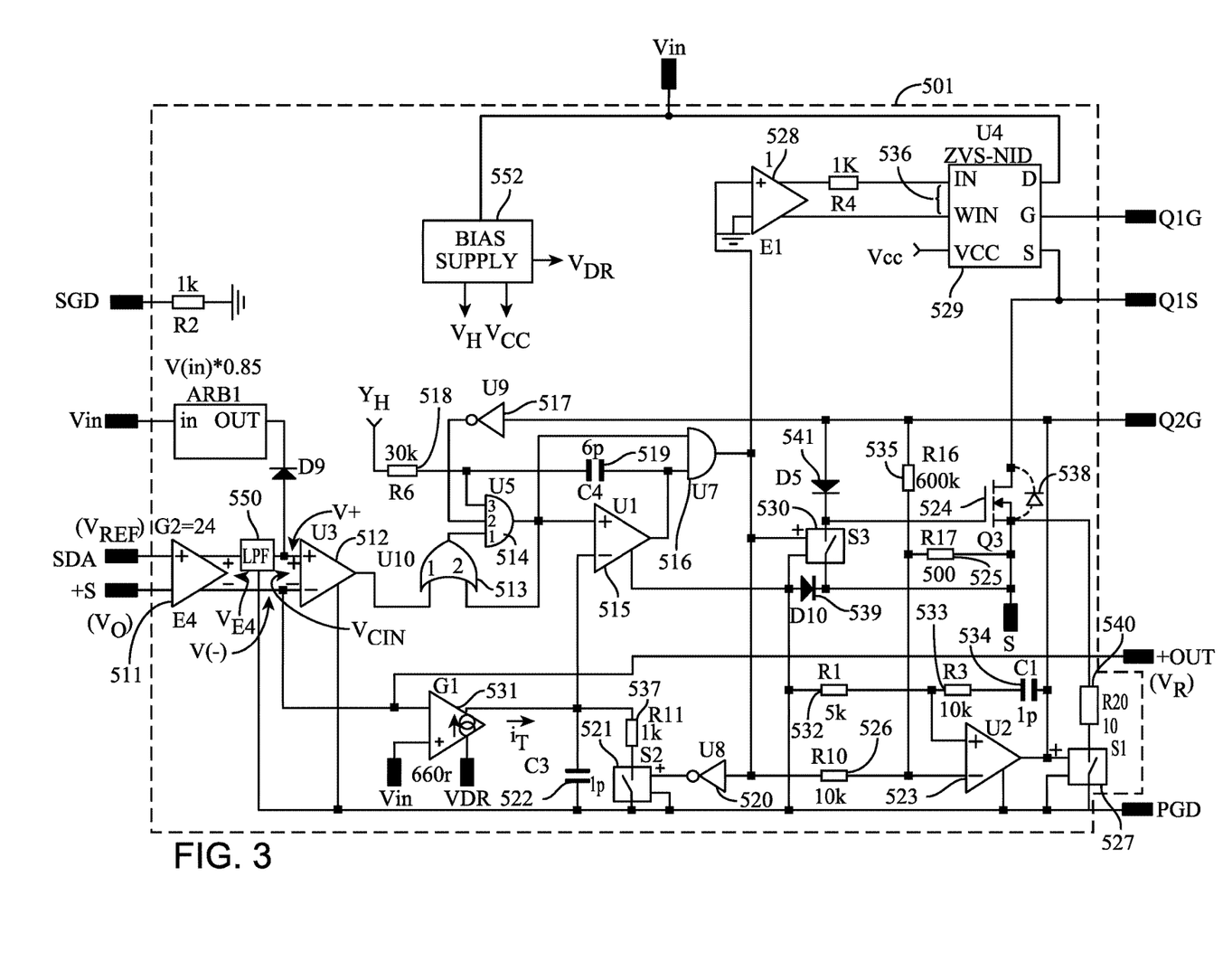
FIG. 3 is a schematic block diagram of a controller for the regulator of FIG. 2

A high-bandwidth factorized power system comprising a high-bandwidth controller is shown in FIGS. 2 and 3. In FIG. 2 the factorized power system 300 comprises input source 5, a pre-regulator module implemented using a discontinuous buck converter 200, VTM 400, and load 15. Discontinuous buck converter 200 comprises switches Q1 202 and Q2 204, inductor L6 206, output capacitor C15 208 and controller 500. Resistor R5 207 represents the resistance of inductor L6 206; resistor R9 222 represents the equivalent series resistance of capacitor C15 208. Controller 500 comprises integrated control device IC1 501 and clamp circuit diode D7 502. A reference voltage, indicated by source $V_{REF}$ 40, is applied to control device IC1 501. FIG. 3 is a block diagram showing circuitry contained in control device IC1 501, described below. Bias voltages for circuitry in control device IC1 501 are generated by a bias supply 552 (FIG. 3). In this example, the discontinuous buck converter 200 functions as a pre-regulator module, so the phrases "converter 200" and "regulator 200" will be used interchangeably, and the phrases "buck converter 200" and "buck regulator 200" will be used interchangeably.

Figure 4A:
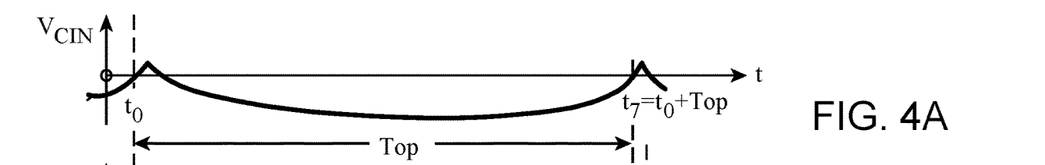
FIGS. 4A though 4F show waveforms for a power system according to the invention.
Figure 4B:
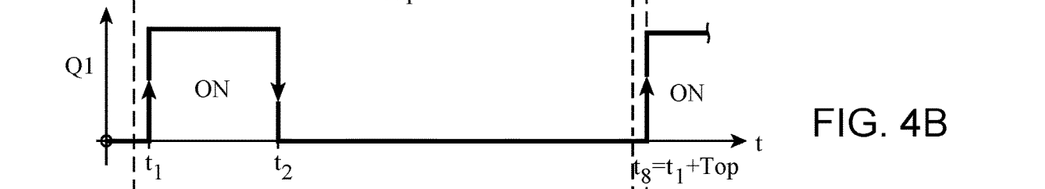
Figure 4C:
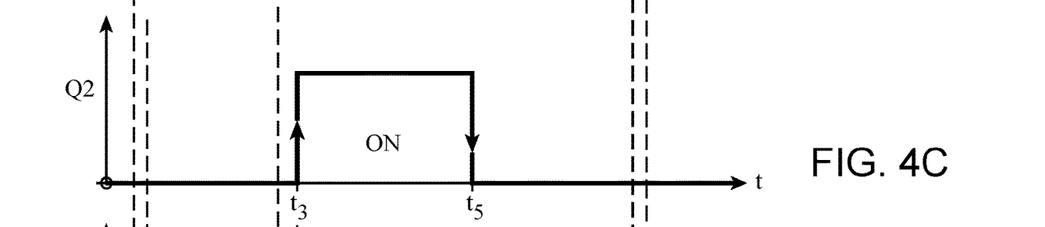
Figure 4D:
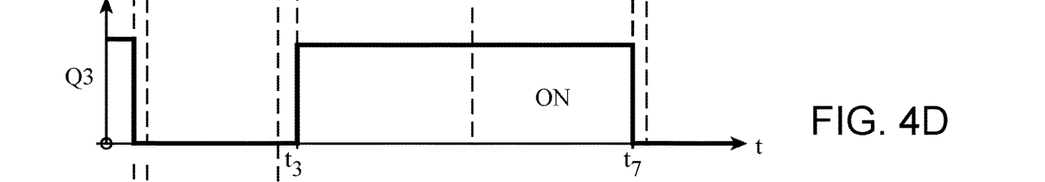
Figure 4E:
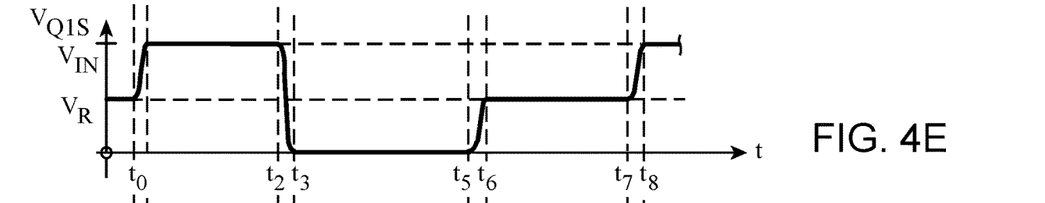
Figure 4F:
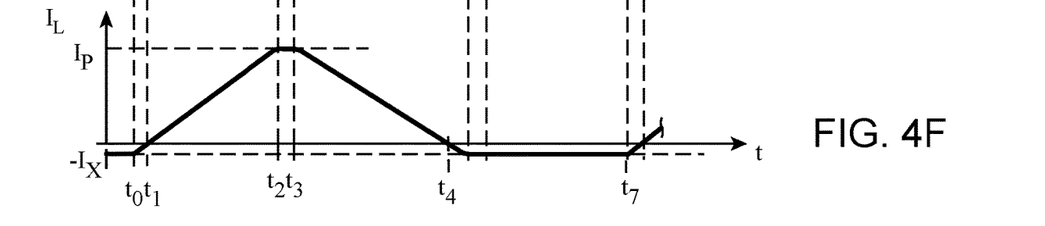

In operation, controller 500 operates the discontinuous buck converter 200 in a series of converter operating cycles. Waveforms for one such cycle, under steady-state load conditions, are illustrated in FIGS. 4A through 4F. The "load condition" for the buck converter 200 refers to the amount of power that the VTM 400 draws from the buck converter 200. FIG. 4A shows the voltage, $V_{CIN}$, between the inputs of high-speed comparator U3 512; FIG. 4B shows the state of switch Q1 202; FIG. 4C shows the state of switch Q2 204; FIG. 4D shows the state of clamp switch Q3 524; FIG. 4E shows the voltage, $V_{Q1S}$, at node Q1S between the source of Q1 and the drain of Q2; FIG. 4F shows the current, $I_L$, in inductor L6 206.

Referring to FIGS. 2, 3 and 4, just prior to time to the input to high-speed comparator U3 512, $V_{CIN}$, is slightly below zero and the voltage at the outputs of comparator U3 512, OR gate U10 513, AND gate U5 514, comparator U1 515, and AND gate U7 516 are all low; the output of inverter U8 520 is high, switch S2 521 is ON and capacitor C3 522 is discharged to a low voltage $i_T$*R11 (537 FIG. 3); switches S3 530 and S1 527 are OFF; clamp switch Q3 524 is ON and the clamp circuit comprising Q3 524 and diode D7 502 conducts inductor current $I_L = -I_X$ (FIG. 4F); terminal "S" (connected between the source terminal of switch Q3 524 and diode D7 502) is one diode drop above the voltage, $V_R$, forcing the output of comparator U2 low (via divider R17 525 and R10 526) holding the gate of Q2 204 low (via terminal Q2G) and holding Q2 OFF; and the output of difference amplifier/level shifter E1 528 is low, delivering a low input to ZVS-NID (Zero-Voltage Switching, Non-Inverting Driver) driver 529 which holds the gate-to-source voltage of Q1 low, holding Q1 OFF. Here, $i_T$ is the current output from a voltage-controlled current source G1 531, and $I_L$ is the current flowing through the inductor L6 206. High-speed comparator U3 is non-hysteretic: its fixed input threshold is nominally zero volts, irrespective of the state of its output.

At time to, the output voltage, $V_O$, drops below the reference voltage, $V_{REF}$, causing the voltage, $V_{CIN}$, at the input to high-speed comparator U3 512 to go positive, causing the output of high-speed comparator U3 512, and as a result, the output of OR gate U10 513, to go high which drives input 1 of AND gate U5 514 high. Because Q2G is low at this time, the output of inverter U9 517 drives input 2 of AND gate U5 high. Input 3 of AND gate U5, connected through R6 518 to a logic high level bias voltage, $V_H$, is also high at this time. With all three of its inputs high, the output of AND gate U5 goes high, driving the output of comparator U1 515 high. The high outputs of AND gate U5 and comparator U1 drive the output of AND gate U7 516 high. A connection between the output of AND gate U5 514 and input 2 of OR gate U10 513 will hold the output of OR gate U10 in its high state for as long as input 2 of OR gate U10 is held high, preventing transitions of the output of U3 512 propagating to the output of OR gate U10.

The high output of AND gate U7 516 turns switch S3 530 ON, shorting the gate of clamp switch Q3 524 to the source of Q3, turning the clamp switch Q3 OFF (time to, FIG. 4D). With the clamp switch Q3 OFF, a zero-voltage switching ("ZVS") phase begins, during which the negative current flowing in inductor L6 206 ($-I_X$, FIG. 4F) charges and discharges parasitic capacitances of switches Q1 202 and Q2 204 (FIG. 2) causing the voltage, $V_{Q1S}$, at node Q1S to increase towards Vin (FIG. 4E) and the voltage across switch Q1 202 (FIG. 2) to decline towards zero. The high output of AND gate U7 also drives the input 536 to ZVS-NID driver ("Zero-Voltage Switching, Non-Inverting Driver") U4 529 to go high. The preferred ZVS-NID driver 529 is described in Driving Semiconductor Switches in Power Converters, U.S. application Ser. No. 17/881,144 filed Aug. 4, 2022, assigned to Vicor Corporation, the entire disclosure of which is incorporated here by reference (the "ZVS-NID Application"). As disclosed in the ZVS-NID application, the ZVS-NID driver 529 will delay turning switch Q1 202 ON until it senses that the voltage across Q1 202 (FIG. 2) has declined to less than a threshold, or, in the event that the threshold condition is not met, control the gate drive to Q1 202 to effect a slow, controlled, rate-of-change in its drain-to-source voltage. FIG. 4E shows a "full ZVS" example, with Q1's drain-to-source capacitance being discharged to zero, and the voltage $V_{Q1S}$ rising to equal $V_{in}$, at time $t_1$, at which time the ZVS-NID driver 529 turns Q1 202 ON (FIG. 4B). The turning ON of switch Q1 202 (FIG. 2) begins an input phase of the operating cycle during which energy storage in the inductor increases, i.e. a positive (in the convention shown in FIG. 2) current, $I_L$, flowing in the inductor increases linearly, and energy is delivered to the output of the converter.

The output of AND gate U7 516 going high at time to turns switch S2 521 OFF (via inverter U8 520), enabling charging of timing capacitor C3 522 by voltage-controlled current source G1 531, which supplies a current $i_T = Gr*(V_{in} - OUT+)$, where Cr is a pre-determined constant and OUT+ is the buck regulator output voltage $V_R$. The timing capacitor C3 522 will charge linearly until, at time $t_2$, the voltage across C3 522 meets or exceeds the voltage, $V_H$, delivered by the high output of AND gate U5 514 at the +input of comparator U1 515, causing the outputs of U1 515 and U7 516 to go low: turning switch Q1 202 (FIG. 2) OFF (FIG. 4B) via difference amplifier/level shifter E1 528 and ZVS-NID driver U4 529 ending the input phase. The output of AND gate U7 516 going low also turns switch S2 521 ON (via inverter U8 520) which discharges C3 522 to a voltage $V_{R11} = I_T$*R11. The duration, $t_1$ to $t_2$, of the input phase is therefore inversely proportional to $(V_{in} - V_R)$:

$$t_2 - t_1 = (V_H - V_{R11})*C3/(G_T*(V_{in} - V_R)).$$

Because the rate of rise of current in the inductor during the energy storage interval is proportional to $(V_{in} - V_R)$, varying the length of the input phase inversely to $(V_{in} - V_R)$ results in an essentially constant value of peak inductor current, $I_P$ (FIG. 4F), irrespective of variations in $V_{in}$ and/or $V_R$:

$$I_P = (V_{in} - V_R)*(t_2 - t_1)/L = (V_H - V_{R11})*C3/(G_T*L).$$

Following time $t_2$, switches Q1 202 and Q2 204 (FIG. 2) are both OFF (FIGS. 4B and 4C) and the inductor current, $I_L$ (which has reached its peak, $I_L = I_P$) charges and discharges parasitic capacitances of switches Q1 202 and Q2 204, causing the voltage, $V_{Q1S}$, at node Q1S to decrease (FIG. 4E) until at time $t_3$, it goes negative and the Q1S node is clamped by the series connection of diode D10 539 and intrinsic diode 538 of clamp switch Q3 524. The negative voltage across D10 539 causes the output of comparator U2 523 to go high, bringing terminal Q2G high, which turns Q2 204 (FIG. 2) ON (FIG. 4C), enables clamp switch Q3 524 ON (FIG. 4D) via diode D5 541 and, via inverter U9 517, brings input 2 of gate U5 514 low, forcing the output of AND gate U7 516 to remain low at least until Q2G goes low to turn Q2 204 (FIG. 2) OFF ($t_5$, FIG. 4C). The high output of comparator U2 523 also turns switch S1 527 ON, connecting low value resistor (e.g., 10 ohms) R20 540 (which may be the intrinsic resistance of switch S1 527) in series with clamp switch Q3 524. With both Q2 204 (FIG. 2) and Q3 524 (FIG. 3) ON, a portion of the negative voltage that appears at the Q1S terminal (owing to the flow of inductor current in the switches) appears across R20, resulting in a negative voltage at the (−) input of comparator U2 523 (via R17 and R10) and holding the output of comparator U2 523 high.

Between times $t_3$ and $t_4$ (FIGS. 4B, 4C), switch Q2 204 (FIG. 2) is ON and switch Q1 202 (FIG. 2) is OFF, inductor L6 206 (FIG. 2) is connected across the regulator output and positive current in the inductor, $I_L$, declines toward zero as energy stored in the inductor is transferred to the regulator output during an output phase of the operating cycle. At time $t_4$ the inductor current crosses zero and reverses direction (goes negative). The negative inductor current causes the voltage at the Q1S node, $V_{Q1S}$, i.e., across Q2 204, to become positive with respect to ground and node PGD. With switch Q2 204 (FIG. 2) remaining ON during this time, the positive voltage across Q2 204 and at node Q1S is limited. With switches S1 527 and Q3 524 (FIG. 3) ON, a portion of the voltage at the Q1S node, $V_{Q1S}$, appears across R20 540, resulting in a positive voltage at the (−) input of comparator U2 523 (via R17 and R10), causing the output of U2 523 to go low at time $t_5$. The low output of U2 523 brings Q2G low, turning Q2 204 OFF (FIG. 4C) which ends the output phase. The low output of comparator U2 523 also opens switch S1 527, which with switches Q1 202 and Q2 204 OFF, allows the reverse inductor current, $I_L$, to charge and discharge parasitic capacitances associated with switches Q1 202 and Q2 204 causing the voltage, $V_{Q1S}$, at node Q1S to increase (FIG. 4E). The increasing voltage at $V_{Q1S}$ holds the (−) input of comparator U2 523 at a positive voltage (via Q3, R17, R10), keeping the output of U2 523 low (C1 534, and resistors R3 533 and R1 532, briefly pull the (+) input of U2 523 negative following the high-to-low transition of U2's output to hold U2's output low until $V_{Q1S}$ has gotten large enough to do so).

A clamp circuit comprising clamp switch Q3 524 (which remains ON) and diode D7 502 (FIG. 2) is connected across inductor L6 206. At time $t_6$, when the voltage at $V_{Q1S}$ increases above the regulator output voltage, $V_R$, diode D7 becomes forward biased and the inductor current, $I_L=-I_x$, commutates into the clamp circuit, beginning a clamp phase of the operating cycle (clamp switch Q3 524 is held ON during the clamp phase by stored gate charge). The phrase "the clamp circuit is turned ON" means that the clamp switch Q3 524 is turned on, and the phrase "the clamp circuit is turned OFF" means that the clamp switch Q3 524 is turned off. As disclosed in the Loss and Noise Reduction Patent, and in the Adaptive Patent, clamping the inductor L6 in this way reduces or eliminates high frequency oscillation following the opening of Q2 204 and also traps energy in the inductor L6 for effecting ZVS at the beginning of the next operating cycle. The clamp phase (also referred to as the clamp interval) ends at the beginning of the next operating cycle, at time $t_7=t_0+T_{OP}$, where Tor is the operating period of the regulator 200 and $f_{OP}=1/T_{OP}$ is the regulator operating frequency (which in this example is the operating frequency of the buck converter 200).

As the load on the converter 200 is increased, the length of the clamp phase will decrease, increasing the operating frequency of the converter 200. Likewise, reduced load will result in reduced operating frequency. At some maximum load, the duration of the clamp phase, $t_6$ to $t_7$ will be reduced nearly to zero. The phrase "the load on the converter 200" refers to the power that the VTM 400 draws from the converter 200, and the term "maximum load" refers to the maximum amount of power that the converter 200 is designed to provide to the VTM 400. In this example, because the output voltage of the converter 200 is relatively constant, the phrase "the load on the converter 200" may also refer to the current that the VTM 400 draws from the converter 200, and the term "maximum load" may also refer to the maximum amount of current that the converter 200 is designed to provide to the VTM 400.

The buck regulator 200 features high-bandwidth, cycle-by-cycle control of energy transfer to its output. As described above, under steady-state operating conditions and at a load less than or equal to the maximum allowable load, each time $V_{CIN}$, at the input to comparator U3 512, goes above zero, the output of high-speed comparator U3 512 will be driven high and a new operating cycle will be started. In this way, the minimum peak of the output voltage of the regulator 200, i.e. the voltage corresponding to the minimum peaks of the output ripple, is precluded from falling substantially below the voltage at the (+) input of U3 512 (i.e., V+, FIG. 3). Because the peak-to-peak output ripple is made small by design, and because the average value of $V_R$ will be within the peak-to-peak ripple band, this control method effectively regulates the average output voltage to be within a narrow range that is above the voltage V+. As load is increased, the length of the clamp phase, and of $T_{OP}$, will decrease until, at some maximum load, the beginning of a new operating cycle will be initiated a very short delay time (e.g., the ZVS period between to and $t_1$ and propagation delays in control elements) after the end of the output phase of the preceding cycle. For example, the very short delay time can be 10 nS. In some implementations, the short delay time may be in a range from 10 nS to 100 nS. Use of a non-hysteretic high-speed comparator as a control element of a high-bandwidth Factorized Power Architecture ("FPA") system comprising a discontinuous mode regulator (e.g., 10, 200) and a fixed ratio converter (e.g., 20, 400) enables fast, cycle-by-cycle control of energy transfer through the regulator during each operating cycle. This provides high-bandwidth FPA systems with much faster response to load transients than prior art FPA systems, which were bandwidth-limited by control methods involving pole-zero compensated error-amplifiers. For example, the response time of the discontinuous mode regulator 10 or 200 to a load step may be less than 100 nS.

In a factorized power system (FIG. 2), the VTM 400 output voltage, $V_O=K*V_R-R_O*I_O$, may be regulated. Referring to FIG. 3, finite gain difference amplifier E4 511 subtracts the VTM output voltage, $V_O$, at the +S terminal (FIG. 2, FIG. 3), from a reference voltage, $V_{REF}$, indicative of the desired VTM output voltage, and delivers an output $V_{E4}=G2*(V_{REF}-V_O)$, where G2 is the gain of the difference amplifier E4 511. The (−) output of E4 is at $V_R$ and the (+) output of E4 is the sum of $V_R$ and $V_{E4}$. The low pass filter (LPF) 550 smooths the (+) output over a few operating cycles and delivers the "averaged" result to the (+) input of U3 512, V+. Since the average value of $V_R$ appears at both inputs to U3 512, the input to the comparator, $V_{CIN}$, is closely approximated as the difference between the time-varying, zero average value, ripple voltage component Vrip (t) at the (−) input of U3 512 and the essentially DC component G2*(Vref−$V_O$) at the (+) input of U3 512. Operation converges on a value of $V_O$ at which the peak negative deviation of Vrip(t), Vripmin, causes $V_{CIN}$ to go positive, enabling U3 512 to initiate an operating cycle, and this corresponds to a difference between $V_{REF}$ and $V_O$ that is approximately Vripmin/G2. Since Vripmin is, by design, at most a few percent of $V_R$, the error in $V_O$ relative to $V_{REF}$ may be made small for modest values of G2. For example, if G2 is set equal to the transformation ratio, K, of the VTM 400, then the percentage deviation of $V_O$ from $V_{REF}$ will be essentially equal to the percentage of peak ripple on the regulator output voltage. In some implementations, the controller 500 may control the switches Q1 202, Q2 204 to preclude the minimum peak of the output voltage $V_O$ of the VTM 400 from falling substantially below the reference voltage, $V_{REF}$, e.g., preclude the minimum peak of the output voltage $V_O$ of the VTM 400 from falling below 95% of the reference voltage, $V_{REF}$. Increasing the gain G2 of the difference amplifier E4 511 may improve regulation, but at the expense of amplifier bandwidth and response time.

In the buck regulator 200 described in FIGS. 2, 3 and 4, each operating cycle of the regulator comprises a first ZVS phase, an input phase, a second ZVS phase, an output phase, and, at loads below a maximum load, a clamp phase. To prevent erratic operation, it is important to prevent high-speed comparator U3 512 from initiating a new operating cycle until the input and output phases of an ongoing cycle are complete. Once an operating cycle is initiated by the output of U3 512 going high, circuitry in controller 500 operates to define a blanking interval during which another cycle cannot be initiated, comprising: starting at time to and continuing throughout the input phase, the high output of U5 514 is fed back to input 2 of OR gate U10 513, holding U10's output high and preventing transitions in U3's output from propagating through U10 513; at time $t_2$, when the input phase ends and the output of U1 515 goes low, input 3 of AND gate U5 514 is pulled momentarily low for a time period, determined by capacitor C4 519 and resistor R6 518, that is long enough to prevent propagation of a signal through gate U5 514 during the second ZVS period ($t_2$ to $t_3$); and, during the output phase ($t_3$ to $t_5$) Q2S is high and input 2 of AND gate U5 514 is held low by the output of inverter U9 517. The combination of these blanking periods prevents initiation of another operating cycle from time to through time $t_5$. The circuitry in the controller 500 that controls the blanking interval is referred to as the blanking circuitry.

If, instead of regulating the output voltage of VTM 400, the output voltage of buck regulator 200, $V_R$, is to be regulated to a reference value, $V_{REF}$, difference amplifier E4 511 and low-pass filter 550 may not be needed and $V_{REF}$ may be connected to the (+) input of U3 512. In this way, a new operating cycle will be initiated when the minimum peaks of the output ripple fall to equal $V_{REF}$. As noted above, this will result in an average value of $V_R$ that is slightly above $V_{REF}$. Because the peak-to-peak ripple in $V_R$ is small, and because the average value of $V_R$ will be within the peak-to-peak ripple band, the difference between the average value of $V_R$ and $V_{REF}$ will be small.

Figure 5A:
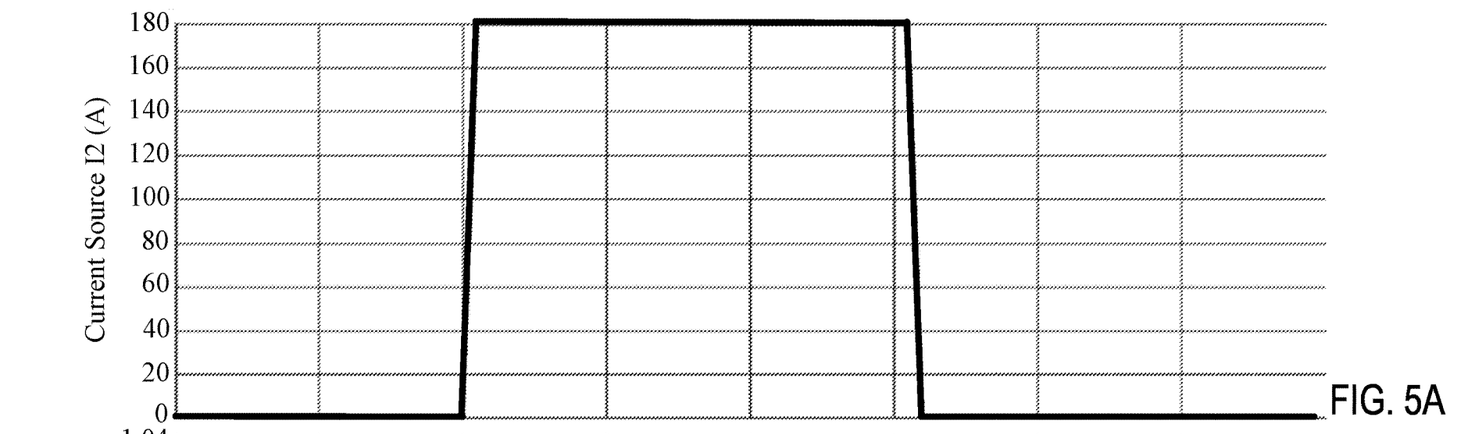
FIGS. 5A and 5B show waveforms for a power system according to the invention.
Figure 5B:
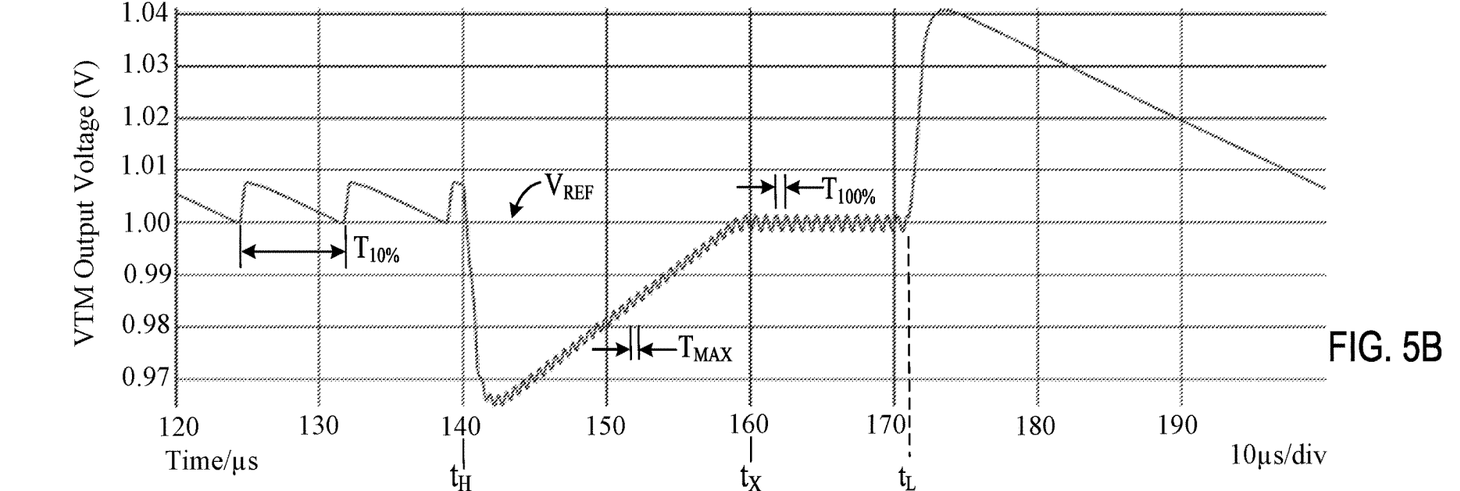

Simulation waveforms for the high-bandwidth Factorized Power System of FIGS. 2, 3 and 4 are shown in FIGS. 5A and 5B. In this example, the input voltage to the system is 54 VDC. The VTM K-factor is ¹⁄₂₄ and the discontinuous mode regulator delivers approximately 24V at its output to support nominally 1V at the VTM's output, which as shown in FIG. 2, is loaded by resistor R31 19 and current source I2 16. FIG. 5A shows a 10% to 100% step in total VTM load current, with current source I2 16 (FIG. 2) increasing from 0 A to 180 A with rise and fall times of approximately 1 microsecond while R31 maintains a 10% minimum load. FIG. 5B shows the VTM's output voltage. As shown in the Figures, the operating period of the discontinuous mode regulator at 10% load, $T_{10\%}$, is nearly 7 microseconds, and the operating period at 100% load, $T_{100\%}$, is nearly 0.7 microsecond. As shown in FIG. 5B, the peak-to-peak output ripple at 10% load is less than 1%, and the peak-to-peak ripple at 100% load is less than about 0.1%. The peak deviation in output voltage in response to each load step is approximately 4%. Response to a load step by this high bandwidth Factorized Power System occurs within 3 microseconds, i.e., much faster than prior art FPA systems using pole-zero compensated error amplifiers. Increased bandwidth results in a substantial reduction in peak transient voltage deviation following dynamic load steps.

With reference to FIG. 5B, at 10% load the VTM's output voltage rises during an initial portion of each operating cycle, as energy is transferred to the regulator output, followed by a period of slower decay associated with discharging of energy from the output storage capacitor (C15 208, FIG. 2) during the portion of the operating cycle during which no energy is transferred to the regulator output. When the output voltage decays to $V_{REF}$ a new cycle is initiated. During the 100% load transient, between $t_H$ and $t_L$, $V_R$ drops below $V_{REF}$ in the period between times $t_H$ and $t_X$. During this time period the output of comparator U3 512 may remain continuously high and a new operating cycle, with period $T_{MAX}$, will be initiated essentially immediately after the output phase of the prior operating period has been completed. When $V_R$ has recovered to a steady-state value, during the period between $t_X$ and $t_L$, the operating periods increase slightly. The 90% reduction in load after time $t_L$ causes a large increase in output voltage, during which the output of comparator U3 512 may remain continuously low and no operating periods will be initiated until the output voltage eventually recovers to its regulated value near $V_{REF}$.

The factorized power conversion system 100 may be used to provide electrical power to a wide variety of devices including, e.g., microprocessors or artificial intelligence (AI) processors.

A number of embodiments of the invention have been described. It is understood, however, that various variations and modifications may be made without departing from the spirit and scope of the invention. For example, a reference voltage may be provided to control circuitry as an analog signal or it may be provided in a digital format and converted, as needed, for use within the control circuitry. A reference voltage may be supplied from an external source or it may be provided as part of the converter circuitry. Signals, such as reference or output voltages, may be scaled for use in controlling a converter. Regulators in factorized power systems may, or may not, comprise a multiplicity of ZVS intervals, as described herein. A clamp switch may be turned ON at any time during the ON time of switch Q2 204 (FIG. 2). Circuits described herein may be configured with any mix of integrated and discrete components. The transformation ratio K may be different from the exemplary values mentioned above. In some examples, the transformation ratio K is less than 1. In this case, the PRM 10 provides power to the VTM 20 at a higher voltage and a lower current, and the VTM 20 delivers power to the load 15 at a lower voltage and a higher current. In some examples, the transformation ratio K is greater than 1. In this case, the VTM 20 generates an output voltage that is greater than the output voltage of the pre-regulator module 10.

Accordingly, other embodiments are within the scope of the following claims:

What is claimed is:
1. A high-bandwidth power system comprising:
   a discontinuous-mode pre-regulator receiving an input voltage from an input source and delivering a pre-regulator output voltage in a series of operating cycles, each operating cycle comprising an input phase during which energy is drawn from the input source and an output phase during which energy is delivered to the pre-regulator output, the pre-regulator circuit being a self-contained assembly adapted to be installed as a unit at a first location; and a fixed-ratio power converter, characterized by a fixed input-to-output voltage transformation ratio, K, and an output resistance, comprising an input connected to the pre-regulator output and an output connected to a load at an output voltage, the fixed ratio power converter being a self-contained assembly adapted to be installed as a unit at a second location separated from the first location;

wherein the discontinuous mode pre-regulator is configured to begin the input phase of an operating cycle after the end of the output phase a short delay time after sensing that the output voltage is below an output voltage threshold.

2. The system of claim 1 wherein the fixed-ratio power converter comprises a Sine Amplitude Converter.

3. The system of claim 1 wherein the discontinuous mode pre-regulator comprises a buck converter comprising a first switch, a second switch, an inductor, and a controller for controlling the switches to regulate the output voltage.

4. The system of claim 3 wherein the output voltage is regulated to an average level above the output voltage threshold.

5. The system of claim 4 in which the output voltage threshold is a reference voltage, $V_{REF}$.

6. The system of claim 5 in which the controller is configured to control the switches to preclude the minimum peak of the output voltage from falling substantially below the reference voltage, $V_{REF}$.

7. The system of claim 6 in which the controller is configured to control the switches to preclude the minimum peak of the output voltage from falling below 95% of the reference voltage, $V_{REF}$.

8. The system of claim 3 wherein the controller comprises:

a comparator for sensing when the output voltage is below the output voltage threshold, and circuitry configured to, upon the comparator sensing the output voltage is below the output voltage threshold:

turn the first switch ON, within the short delay time after the sensing by the comparator, to initiate the input phase during which a forward current increases in the inductor, turn the first switch OFF to end the input phase, turn the second switch ON after the voltage across the second switch has fallen below a zero-voltage switching (ZVS) threshold following the end of the input phase, turn the second switch OFF to end the output phase when the current in the inductor crosses a current threshold, and hold the first and second switches OFF after the end of the output phase if the pre-regulator output voltage is above the output voltage threshold.

9. The system of claim 8, wherein the pre-regulator further comprises a clamp circuit for trapping energy in the inductor by effectively short-circuiting the inductor during a portion of the operating cycle.

10. The system of claim 9 in which the clamp circuit comprises a semiconductor switch.

11. The system of claim 10 in which the semiconductor switch comprises a field-effect transistor.

12. The system of claim 8 in which the current threshold is selected to end the output phase after the inductor current reverses.

13. The system of claim 12 in which the clamp circuit is configured to conduct reverse inductor current after the inductor current has reached the current threshold.

14. The system of claim 13 in which the flow of reverse current after the second switch is turned OFF charges and discharges parasitic capacitances of the first and second switches.

15. The system of claim 13 in which the clamp circuit is turned OFF when the pre-regulator output voltage is below the output voltage threshold.

16. The system of claim 15 in which the flow of reverse current after the clamp circuit is turned OFF charges and discharges parasitic capacitances of the first and second switches.

17. The system of claim 8 wherein the controller adjusts the ON time of the first switch so that the current in the inductor at the end of the input phase, $I_P$, is substantially independent of the values of the pre-regulator input and output voltages.

18. The system of claim 8 wherein the controller adjusts the ON time of the first switch to be inversely proportional to a difference between the input voltage and the pre-regulator output voltage.

19. The system of claim 8 further comprising blanking circuitry for preventing initiation of an operating cycle during a period beginning with the sensing by the comparator and ending at the end of the output phase.

20. The system of claim 3, wherein the pre-regulator further comprises a clamp circuit for trapping energy in the inductor during a portion of the operating cycle.

21. The system of claim 3 in which the output voltage is approximately equal to the pre-regulator output voltage multiplied by K.

22. The system of claim 21 wherein the output voltage is approximately equal to $K*V_R - R_O*I_O$, $V_R$ is the pre-regulator output voltage, $R_O$ is the output resistance of the power converter, and $I_O$ is an output current of the power converter delivered to the load.

23. The system of claim 21 including an error amplifier with a fixed gain of the order of G=1/K, where K is the transformation ratio of the fixed-ratio power converter.

24. The system of claim 1 wherein the discontinuous mode pre-regulator comprises a buck-boost converter comprising a first switch, an inductor, and a controller for controlling the switches to regulate the output voltage.

25. The system of claim 24 in which the output voltage is approximately equal to the pre-regulator output voltage multiplied by K.

26. The system of claim 25 wherein the output voltage is approximately equal to $K*V_R - R_O*I_O$, $V_R$ is the pre-regulator output voltage, $R_O$ is the output resistance of the power converter, and $I_O$ is an output current of the power converter delivered to the load.

27. The system of claim 25 including an error amplifier with a fixed gain of the order of G=1/K, where K is the transformation ratio of the fixed-ratio power converter.

28. The system of claim 1 wherein the short delay time is in a range from 10 to 100 nS.

29. The system of claim 1 wherein the first location is at least 2 inches away from the load, and the second location is within 1 inch from the load.

30. The system of claim 1 wherein the self-contained assembly of the pre-regulator comprises a first circuit board or substrate, a first set of electronic components mounted on or in the first circuit board or substrate, and wherein the self-contained assembly of the fixed-ratio power converter comprises a second circuit board or substrate different from the first circuit board or substrate, and a second set of electronic components mounted on or in the second circuit board or substrate.

31. A discontinuous mode regulator comprising:
an input for receiving power from an input source at an input voltage,
an output for delivering power to a load at an output voltage,
an inductor,
switches for connecting the input source to the inductor,
a clamp circuit connected across the inductor for trapping energy in the inductor by effectively short-circuiting the inductor during a portion of the operating cycle, and
a discontinuous-mode controller for controlling the switches in the regulator in a series of operating cycles, comprising:
an input for sensing the output voltage;
a comparator for sensing when the output voltage is below an output voltage threshold;
circuitry for controlling the switches in a series of operating cycles, each operating cycle comprising:
a ZVS phase during which an inductor current charges and discharges parasitic capacitances associated with the switches;
an input phase during which the inductor is connected to the input and a forward current increases in the inductor; and
a clamp interval during which the clamp circuit is ON, trapping a reverse flow of current in the inductor,
wherein the controller is configured to begin the input phase of an operating cycle after the end of the output phase a short delay time after sensing that the pre-regulator output voltage is below the output voltage threshold.

32. The regulator of claim 31 in which the clamp circuit comprises a semiconductor switch.

33. The regulator of claim 32 in which the semiconductor switch comprises a field- effect transistor.

34. The regulator of claim 31 in which the controller is configured to end the output phase after the inductor current reverses.

35. The regulator of claim 34 in which the clamp circuit is configured to conduct reverse inductor current after the end of the output phase.

36. The regulator of claim 35 in which the clamp circuit is configured to be turned OFF when the output voltage is below the output voltage threshold.

37. The regulator of claim 31 wherein the controller is configured to adjust the duration of the input phase so that the current in the inductor at the end of the input phase, $I_P$, is substantially independent of the values of the input and output voltages.

38. The regulator of claim 31 wherein the controller is configured to adjust the duration of the input phase to be inversely proportional to a difference between the input voltage and the output voltage.

39. The regulator of claim 31, further comprising blanking circuitry for preventing initiation of an operating cycle before the end of the output phase.

40. The regulator of claim 31 in which the controller is configured to control the switches to preclude the minimum peak of the output voltage from falling substantially below the output voltage threshold.

41. The regulator of claim 40, wherein the controller is configured to control the switches to preclude the minimum peak of the output voltage from falling below 95% of the output voltage threshold.

42. The regulator of claim 40 in which the output voltage threshold is a reference voltage, $V_{REF}$.

43. The regulator of claim 31 wherein the short delay time is in a range from 10 to 100 nS.

44. A method for providing high-bandwidth control in a factorized power conversion system, wherein the factorized power conversion system comprises:
a discontinuous-mode pre-regulator configured to receive an input voltage from an input source and deliver a pre-regulator output voltage in a series of operating cycles, each operating cycle comprising an input phase during which energy is drawn from the input source and an output phase during which energy is delivered to the pre-regulator output, the pre-regulator being a self-contained assembly adapted to be installed as a unit at a first location and comprising a first switch, a second switch, an inductor, and a controller, and
a fixed-ratio power converter, characterized by a fixed input-to-output voltage transformation ratio, K, and an output resistance, comprising an input connected to the pre-regulator output and an output connected to a load, the fixed ratio power converter being a self-contained assembly adapted to be installed as a unit at a second location separated from the first location;
wherein the method for providing high-bandwidth control comprises:
providing a comparator in the controller;
arranging the comparator to generate a sense signal when the output voltage falls below a minimum threshold;
arranging the controller to:
turn the first switch ON to initiate the input phase;
turn the second switch ON when a voltage across the second switch falls below a voltage threshold following the input phase;
turn the second switch OFF when an inductor current crosses a current threshold;
generate a blanking interval beginning with the turn-ON of the first switch and ending with the turn-OFF of the second switch; and
turn the first switch ON after a short delay time if the comparator is generating the sense signal, except during the blanking interval.

45. The method of claim 44 in which the pre-regulator further comprises a clamp circuit and the controller is arranged to turn ON the clamp circuit to store energy in the inductor during a clamp phase.

46. The method of claim 44 wherein the short delay time is in a range from 10 to 100 nS.

47. The method of claim 44 wherein the first location is at least 2 inches away from the load, and the second location is within 1 inch from the load.

48. A method for high-bandwidth control of a discontinuous-mode regulator, the regulator receiving an input voltage from an input source and delivering a regulator output voltage to a load in a series of operating cycles, each operating cycle comprising an input phase during which energy is drawn from the input source and an output phase during which energy is delivered to the regulator output, the regulator comprising a first switch, a second switch, an inductor, a clamp circuit, and a controller, the method comprising:
providing a comparator in the controller;

arranging the comparator to sense the regulator output voltage and generate a start signal when the regulator output voltage falls below a minimum threshold;
arranging the controller to:
turn the first switch ON to initiate the input phase;
turn the second switch ON when a voltage across the second switch falls below a threshold following the input phase;
turn the second switch OFF when an inductor current crosses a threshold;
turn ON the clamp circuit to store energy in the inductor during a clamp phase;
generate a blanking signal beginning with the turn-ON of the first switch and ending with the turn-OFF of the second switch; and
turn the first switch ON after a short delay time if the comparator is generating the sense signal, except during the blanking interval.

49. The method of claim 48, further comprising providing a fixed-ratio power converter having a fixed voltage transformation ratio, K, and a converter output resistance Ro, wherein the fixed-ratio power converter comprises a converter input and a converter output, the converter input is electrically connected to an output of the discontinuous mode regulator, the fixed-ratio power converter being the load of the discontinuous-mode regulator, the converter output being electrically connected to a second load;
wherein the fixed-ratio power converter delivers power to the load at an output voltage Vo that is approximated by Vo=K* $V_R$–Ro*Io, in which Io represents a fixed-ratio power converter output current delivered to the load.

50. An apparatus comprising:
a discontinuous mode regulator that performs cycle-by-cycle control of energy transfer through the regulator during each of a plurality of operating cycles, wherein the regulator comprises a comparator configured to sense a regulator output voltage VR and generate a start signal when the regulator output voltage VR falls below an output voltage threshold, and wherein the start signal indicates a beginning of a new operating cycle;
wherein the discontinuous mode regulator is configured to operate with an operating frequency of at least 1 MHz at peak power delivered to an output node of the discontinuous mode regulator.

51. The apparatus of claim 50, further comprising a fixed-ratio power converter having a fixed voltage transformation ratio, K, and a converter output resistance Ro, wherein the fixed-ratio power converter comprises a converter input and a converter output, the converter input is electrically connected to an output of the discontinuous mode regulator, and the converter output is electrically connected to a load;
wherein the fixed-ratio power converter delivers power to the load at an output voltage Vo that is approximated by Vo=K* $V_R$–Ro*Io, in which Io represents a fixed- ratio power converter output current delivered to the load.

52. The apparatus of claim 51, wherein a peak current delivered by the fixed-ratio power converter to the load is in a range from 100 A to 1000 A.

53. The apparatus of claim 51, wherein the discontinuous mode regulator is configured to provide an output voltage with a ripple voltage less than 5% at 10% of maximum output power, and a ripple voltage less than 1% at 100% of maximum output power.

54. The apparatus of claim 53, wherein the discontinuous mode regulator is configured to provide an output voltage with a ripple voltage less than 1% at 10% of maximum output power, and a ripple voltage less than 0.1% at 100% maximum output power.

55. A high-bandwidth power system comprising:
a discontinuous-mode pre-regulator receiving an input voltage from an input source and delivering a pre-regulator output voltage in a series of operating cycles, each operating cycle comprising an input phase during which energy is drawn from the input source and an output phase during which energy is delivered to the pre-regulator output, the pre-regulator circuit being a self-contained assembly adapted to be installed as a unit at a first location; and
a fixed-ratio power converter, characterized by a fixed input-to-output voltage transformation ratio, K, and an output resistance, comprising an input connected to the pre-regulator output and an output connected to a load at an output voltage, the fixed ratio power converter being a self-contained assembly adapted to be installed as a unit at a second location separated from the first location;
wherein the discontinuous mode pre-regulator is configured to begin the input phase of an operating cycle after the end of the output phase a short delay time after a sensed voltage is below an output voltage threshold.

56. The high-bandwidth power system of claim 55 wherein the sensed voltage is representative of the pre-regulator output voltage.

57. The high-bandwidth power system of claim 55 wherein the discontinuous mode pre-regulator comprises a buck converter comprising a first switch, a second switch, an inductor, and a controller for controlling the switches to regulate the pre-regulator output voltage.

58. The high-bandwidth power system of claim 57, wherein the pre-regulator output voltage is regulated to an average level above the output voltage threshold.

59. The high-bandwidth power system of claim 58 in which the output voltage threshold is a reference voltage, $V_{REF}$.

60. The high-bandwidth power system of claim 59 in which the controller is configured to control the switches to preclude the minimum peak of the pre-regulator output voltage from falling substantially below the reference voltage, $V_{REF}$.

61. The high-bandwidth power system of claim 60 in which the controller is configured to control the switches to preclude the minimum peak of the pre-regulator output voltage from falling below 95% of the reference voltage, $V_{REF}$.

62. The high-bandwidth power system of claim 57, wherein the controller comprises:
a comparator for sensing when the pre-regulator output voltage is below the output voltage threshold, and
circuitry configured to, upon the comparator sensing the pre-regulator output voltage is below the output voltage threshold:
turn the first switch ON, within the short delay time after the sensing by the comparator, to initiate the input phase during which a forward current increases in the inductor,
turn the first switch OFF to end the input phase,
turn the second switch ON after the voltage across the second switch has fallen below a zero-voltage switching (ZVS) threshold following the end of the input phase, turn the second switch OFF to end the output phase when the current in the inductor crosses a current threshold, and hold the first and second switches OFF after the end of the output phase if the pre-regulator output voltage is above the output voltage threshold.

63. The high-bandwidth power system of claim 62, wherein the pre-regulator further comprises a clamp circuit for trapping energy in the inductor by effectively short-circuiting the inductor during a portion of the operating cycle.

64. The high-bandwidth power system of claim 63 in which the clamp circuit comprises a semiconductor switch.

65. The high-bandwidth power system of claim 64 in which the semiconductor switch comprises a field-effect transistor.

66. The high-bandwidth power system of claim 62 in which the current threshold is selected to end the output phase after the inductor current reverses.

67. The high-bandwidth power system of claim 66 in which the clamp circuit is configured to conduct reverse inductor current after the inductor current has reached the current threshold.

68. The high-bandwidth power system of claim 67 in which the flow of reverse current after the second switch is turned OFF charges and discharges parasitic capacitances of the first and second switches.

69. The high-bandwidth power system of claim 67 in which the clamp circuit is turned OFF when the pre-regulator output voltage is below the output voltage threshold.

70. The high-bandwidth power system of claim 69 in which the flow of reverse current after the clamp circuit is turned OFF charges and discharges parasitic capacitances of the first and second switches.

71. The high-bandwidth power system of claim 62 wherein the controller adjusts the ON time of the first switch so that the current in the inductor at the end of the input phase, $I_P$, is substantially independent of the values of the pre-regulator input and output voltages.

72. The high-bandwidth power system of claim 62 wherein the controller adjusts the ON time of the first switch to be inversely proportional to a difference between the input voltage and the pre-regulator output voltage.

73. The high-bandwidth power system of claim 62 further comprising blanking circuitry for preventing initiation of an operating cycle during a period beginning with the sensing by the comparator and ending at the end of the output phase.

74. The high-bandwidth power system of claim 57, wherein the pre-regulator further comprises a clamp circuit for trapping energy in the inductor during a portion of the operating cycle.

75. The high-bandwidth power system of claim 55 wherein the discontinuous mode pre-regulator comprises a buck-boost converter comprising a first switch, an inductor, and a controller for controlling the switches to regulate the pre-regulator output voltage.

76. The high-bandwidth power system of claim 55 wherein the short delay time is in a range from 10 to 100nS.

77. The high-bandwidth power system of claim 55 wherein the first location is at least 2inches away from the load, and the second location is within 1 inch from the load.

78. The high-bandwidth power system of claim 55 wherein the self-contained assembly of the pre-regulator comprises a first circuit board or substrate, a first set of electronic components mounted on or in the first circuit board or substrate, and wherein the self-contained assembly of the fixed-ratio power converter comprises a second circuit board or substrate different from the first circuit board or substrate, and a second set of electronic components mounted on or in the second circuit board or substrate.

* * * * *